United States Patent
Nerling

(10) Patent No.: US 8,554,375 B2
(45) Date of Patent: Oct. 8, 2013

(54) AIR DENSITY COMPARISON CONTROL

(75) Inventor: Helmut Nerling, Wörthsee (DE)

(73) Assignee: delta green box Patent GmbH & Co. KG, Berlin (DE)

( * ) Notice: Subject to any disclaimer, the term of this patent is extended or adjusted under 35 U.S.C. 154(b) by 944 days.

(21) Appl. No.: 12/095,732

(22) PCT Filed: Nov. 30, 2006

(86) PCT No.: PCT/EP2006/011507
§ 371 (c)(1),
(2), (4) Date: Dec. 11, 2008

(87) PCT Pub. No.: WO2007/062843
PCT Pub. Date: Jun. 7, 2007

(65) Prior Publication Data
US 2010/0161135 A1 Jun. 24, 2010

(30) Foreign Application Priority Data
Dec. 1, 2005 (DE) .......................... 10 2005 057 454

(51) Int. Cl.
G01M 1/38 (2006.01)
F25D 25/00 (2006.01)
F25B 49/00 (2006.01)
G01K 13/00 (2006.01)
G05D 23/32 (2006.01)
G01N 9/00 (2006.01)
F24F 11/00 (2006.01)

(52) U.S. Cl.
USPC .................. 700/276; 62/62; 62/127; 62/129; 62/157; 73/30.04; 454/239

(58) Field of Classification Search
USPC ..................... 700/276; 62/62, 127, 129, 157; 73/30.04; 454/239
See application file for complete search history.

(56) References Cited

U.S. PATENT DOCUMENTS 4,183,184 A * 1/1980 Sargent .......................... 52/2.24
4,189,094 A * 2/1980 Robinson .................... 236/46 R (Continued)

FOREIGN PATENT DOCUMENTS

DE 40 04 519 C2 1/1992
DE 42 26 995 A1 2/1994

(Continued)

OTHER PUBLICATIONS

Written Opinion and International Search Report for International Application No. PCT/2006/011507 (mailed Feb. 23, 2007) (with English translation).

*Primary Examiner* — Kavita Padmanabhan
*Assistant Examiner* — Darrin Dunn
(74) *Attorney, Agent, or Firm* — Klarquist Sparkman, LLP

(57) ABSTRACT

The invention is related to a method and an apparatus for controlling a ventilating system or an air conditioning system of buildings. This controlling is used predominantly in industrial real estates and serves for the establishment and maintenance of the desired room conditions. The method for controlling a ventilating system or an air conditioning system according to the invention uses the air density as the essential parameter for the controlling. The air density depends on the temperature, the air humidity and the air pressure. The air density difference between the introduced air and the room air is kept small.

16 Claims, 2 Drawing Sheets

(56) References Cited

U.S. PATENT DOCUMENTS

| | | | | |
|---|---|---|---|---|
| 4,358,936 A | * | 11/1982 | Ito et al. | 62/229 |
| 4,498,309 A | * | 2/1985 | Kobayashi et al. | 62/186 |
| 4,513,809 A | * | 4/1985 | Schneider et al. | 165/54 |
| 5,259,553 A | * | 11/1993 | Shyu | 236/49.3 |
| 5,261,596 A | * | 11/1993 | Tachibana et al. | 236/49.3 |
| 5,279,609 A | * | 1/1994 | Meckler | 236/49.3 |
| 5,292,280 A | * | 3/1994 | Janu et al. | 454/229 |
| 6,929,062 B2 | | 8/2005 | Bauer | |
| 7,398,821 B2 | * | 7/2008 | Rainer et al. | 165/247 |
| 7,494,524 B1 | * | 2/2009 | Lehmann, Jr. | 55/385.2 |
| 2001/0022222 A1 | * | 9/2001 | Aoki et al. | 165/203 |
| 2002/0036238 A1 | * | 3/2002 | Riley et al. | 236/49.3 |
| 2002/0166659 A1 | * | 11/2002 | Wagner et al. | 165/254 |
| 2003/0042013 A1 | | 3/2003 | Bauer | |
| 2003/0211826 A1 | * | 11/2003 | Faltesek et al. | 454/338 |
| 2004/0006926 A1 | * | 1/2004 | Neeley et al. | 52/6 |
| 2004/0058637 A1 | * | 3/2004 | Laiti | 454/229 |
| 2004/0099002 A1 | | 5/2004 | Michelbach | |
| 2005/0150238 A1 | * | 7/2005 | Helt | 62/176.6 |
| 2005/0241325 A1 | * | 11/2005 | Olney | 62/178 |
| 2005/0279845 A1 | * | 12/2005 | Bagwell et al. | 236/49.4 |
| 2006/0095228 A1 | * | 5/2006 | Wilby | 702/170 |
| 2006/0234621 A1 | * | 10/2006 | Desrochers et al. | 454/239 |
| 2010/0161135 A1 | * | 6/2010 | Nerling | 700/278 |
| 2011/0100617 A1 | | 5/2011 | Bauer | |

FOREIGN PATENT DOCUMENTS

| | | |
|---|---|---|
| DE | 44 30 704 A1 | 3/1996 |
| DE | 196 54 542 C2 | 8/2000 |
| DE | 100 33 209 A1 | 1/2001 |
| EP | 0 415 747 A2 | 3/1991 |
| JP | 2004 293846 A | 10/2004 |
| JP | 2004293846 A * | 10/2004 |

* cited by examiner

AIR DENSITY COMPARISON CONTROL

CROSS REFERENCE TO RELATED APPLICATIONS

This is a U.S. National Stage of International Application No. PCT/EP2006/011507, filed Nov. 30, 2006, which in turn claims the benefit of German patent application No. DE 10 2005 057 454.8, filed Dec. 1, 2005. Both applications are incorporated herein by reference.

FIELD OF THE INVENTION

The invention relates to a method and an apparatus for controlling a ventilating system or an air conditioning system of buildings. Such controlling systems are predominantly used for industrial real estates and serve for the establishment and maintenance of desired room conditions.

STATE OF THE ART

In conventional ventilating systems which are known from the state of the art a constant air amount is continuously blown into the rooms to be ventilated. At most two stages for the blowing-in of air are provided selectively. Such a conventional ventilating system is schematically illustrated in FIG. 1.

The aspirated air is, according to the need and requirement, respectively, proceased, filtered, heated, cooled and humidified or de-humidified and then blown into the room. Temperature measurements and temperature presettings serve as essential parameters for the controlling of the ventilating system. The outlet air is exhausted through a second blower. For the conventional room humidifying and de-humidifying, typically a major part of the prepared air disappears from the inlet air outlet directly in the outlet air aspiration, this effect is called slippage and lies usually in a range of 20% to 30%. Thus, a part of energy spent for the preparing is not used for the air conditioning, consequently the portion of the circulating air increases. The energy spent for the air preparing is not applied optimally.

Additionally, draught problems arise, which occur if the air moves with faster speed in the room.

SUMMARY OF THE INVENTION

It is therefore an object of the present invention to provide a controlling for ventilating systems which solves or at least clearly reduces the problems mentioned above.

This object is solved by the method according to claim 1 and the apparatus according to claim 12. Advantageous embodiments are described in the dependent claims.

The method according to the invention for controlling a ventilating system or an is air conditioning system uses the air density as the essential parameter for the controlling. The air density depends on the temperature, the air humidity and the air pressure. If these three magnitudes are known, then the air density can be calculated from the commonly known formulas.

With knowledge of the air density of the air to be introduced and the air density in the rooms to be air-conditioned, an air density difference controlling can be carried out. This difference is kept as small as possible. With uniform air density thermal and/or draughts are avoided, if the isothermal air is not blown therein.

The introduced air serves as energy carrier for the air conditioning of the room. With air density difference controlling the introduced air disperses efficiently in the room, thereby its energy is used more efficiently in comparison with the conventional ventilating systems. Therefore, the invention is suitable for reducing the need of energy. Furthermore, only a smaller air amount is needed to be introduced for the air-conditioning.

Advantageously, the air density, i.e. the temperature, the air humidity and the air pressure, is measured not only in the inlet air area but also in the room to be air-conditioned. Moreover, the air density can also be measured in the outside area for obtaining reference values. In such a way, the inlet air can be preconditioned in an appropriate manner depending on the desired values for the room temperature and air humidity. It can be, for example, heated or cooled or humidified or dehumidified. The measured outside values are preferably used as reference values in order to control the air conditioning process depending on these, so that it does not come to instability. The danger of instabilities of the controlling exists first of all if it is operated without reference and only measurements in the room and behind the air-conditioning units are carried out. The amount of the air pressure difference between the room and the outside area should not exceed predetermined values.

As guarantee of a good room air quality the same can be measured in the room to be ventilated. For the evaluation the carbon dioxide content can be measured or alternatively an evaluation with the help of a mixed gas sensor can be carried out. The controlling of the outlet air amount depends essentially on the result of the measured air quality. The worse the air quality is, the more air is exhausted form the concerned room and the more fresh air is introduced. A circulating air operation can be abandoned, because essentially only due to the bad air quality the air is exhausted. This air has beforehand completed its task of air-conditioning through the difference density controlling. The effect of the slippage of the conventional ventilating systems is avoided.

For an optimal room air-conditioning the inlet air amount and the outlet air amount can be controlled variably independently form each other. Through this, a better adaptation to the current requirements is achieved.

According to the invention, the air can be introduced into the room with a pressure, which is higher than the pressure in the room, so that the introduced air disperses in the room through essentially non-directional movements, by what draughts are avoided. This occurs through the previous adaptation of the air densities.

For securing the stability of the controlling, an air pressure difference between the room and the outside area can be detected. This difference should not exceed a certain amount, it should not be greater than 10 Pascal, and preferably it should not exceed 6 Pascal. Through the air difference controlling, in the most cases a pressure difference between the room and the outside area will arise. This is a result of the minimization of the air density difference.

The method according to the invention can also advantageously be applied to the ventilation of the swimming-pools. For this application the small air exchange amount has further advantages, for example the water evaporation and the formation of condensation water is reduced.

The invention provides also an apparatus for realizing the controlling. Advantageously, controllable flaps, especially automated controllable flaps are provided at the inlet of the inlet air area and/or at the outlet of the outlet air area. With the help of the these flaps, for example with the ventilating system powered-off an undesired intrusion or leakage of the air can be prevented.

The apparatus according to the invention can also be provided with communication means. Through these communication means the apparatus can be connected to, for example, a network or directly to a computer. In such a way the data which were collected and saved by the apparatus can be retrieved even from a greater distance. Through this the proper operation can be monitored. Furthermore, this facility is very helpful for the maintenance work or for a remote controlling.

According to a further advantageous embodiment of the invention, the apparatus is designed as an additional module, which can be added to a conventional ventilating system. This makes the retrofitting of the already existing systems possible. According to the respective situation, sensors or other elements must be retrofitted in the buildings.

BRIEF DESCRIPTION OF THE DRAWINGS

The invention will be discussed in greater detail in the following with the help of the drawings, from which the further advantages can be clearly seen.

DETAILED DESCRIPTION OF THE DRAWINGS

Figure 1:
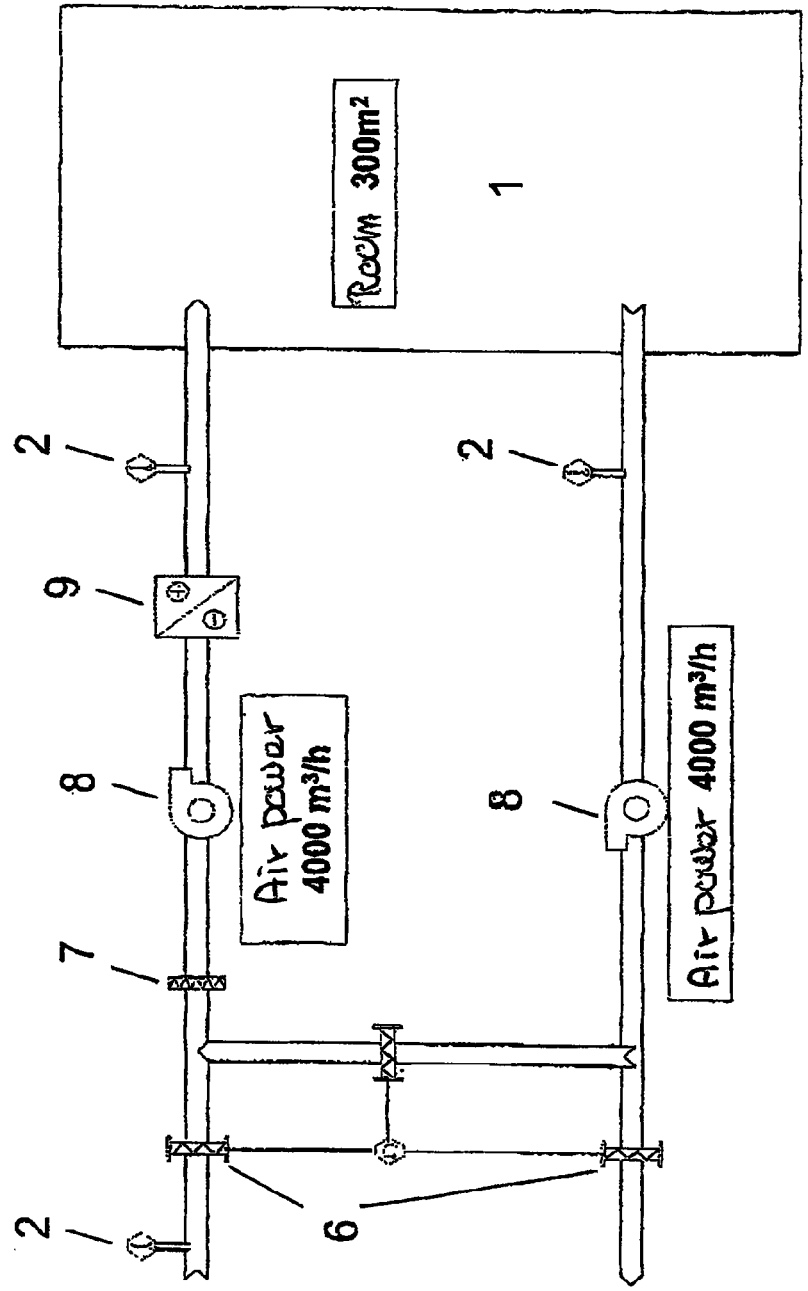
FIG. 1 is a schematic illustration which shows a system according to the prior art.

FIG. 1 is a schematic illustration of a conventional ventilating system. Here, a desired target temperature for the room 1 is selected. The temperature sensor 2 measures the temperature at different sites. Depending on the temperature of the exhausted air, the inlet air is heated or cooled in an air conditioner 9. The air conditioner 9 serves also for the humidifying or the de-humidifying of the air. The inlet air is aspirated from the outside and passes a controllable flap 6 and a filter 7 on its way to the inlet air blower. The air is exhausted from the room 1 with the help of a second blower 8. Both the blowers 8 have a fixed air capacity of for example 4000 m$^3$/h.

For achieving the desired room conditions it is operated with high air exchange rates, this results in high flow speeds of the air. Because due to the high air flow speed a substantial part of the introduced air is exhausted immediately again, an air circulating circuit is provided to increase the energy efficiency. Exhausted air can be output to the outside through a further flap 6.

Figure 2:
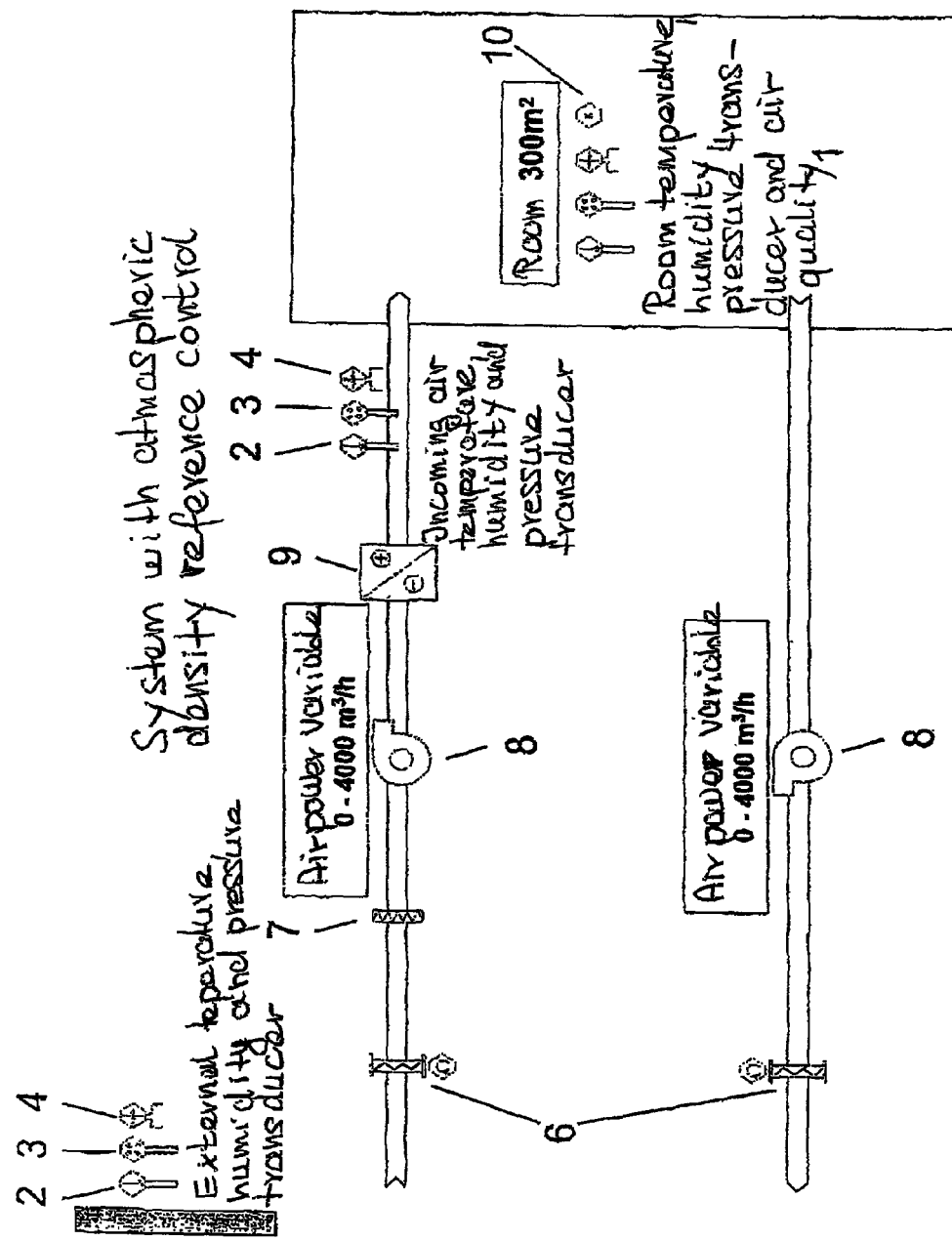
FIG. 2 is a schematic illustration which shows a system according to the invention.

FIG. 2 is a schematic illustration of a system with air density comparison controlling. Comparable objects are provided with the same reference signs, which were already used in FIG. 1. Humidity sensors 3 and pressure sensors 4 are provided here in addition to the temperature sensors 2. Respectively one of these sensors is provided in the outside area, in the inlet area and in room 1. Furthermore, also an air quality sensor 10 is provided in room 1. Furthermore, the blowers 8 are in operation, which are stagelessly adjustable in contrast to the prior art. Alternatively to the stageless adjustability, an adjustability with fine stages can be used.

The air density can be detected for different sites form the measurements of the sensors 2, 3, 4. The air density difference between the air to be introduced and the room air is minimized. This occurs with the help of the air conditioner 9 and the inlet air blower 8, which is stagelessly adjustable, starting at an inlet air amount of, for example, 0 m$^3$/h or 400 m$^3$/h. In this manner, the thermal and a most optimal energy absorption of the introduced heating and cooling energy can be secured. Consequently, smaller air exchange amounts are needed for the air-conditioning. The air-conditioner 9 is applied for the cooling of the room 1 only if an adiabatic cooling is not sufficient any more.

The detected outside air pressure serves as reference value. The difference to the room pressure should not exceed a certain amount.

The air exhaustion is determined essentially by the air quality, which is measured by the air quality sensor 10. The worse the air quality is, the more air is exhausted from the concerned room.

Exemplarily, the method according to the invention at heating or cooling is carried out in the following steps. First, a temperature comparison between the desired room temperature and the actual room temperature occurs, this occurs preferably with the formation of the difference. If the temperature comparison results in a difference between the desired room temperature and the actual room temperature, which is over a predetermined threshold value, the inlet air temperature is adjusted to a high or low temperature, depending on whether the desired room temperature is exceeded or fallen below, respectively. Preferably a maximum heating or cooling temperature is adjusted. The air density difference controlling makes it possible, in comparison with the conventional ventilating systems, to operate with greater temperature differences between the air to be introduced and the room air, because the draughts are avoided by the adapted air density or the air to be introduced. Consequently, the air amount which is needed for achieving a to certain heating or cooling effect can be reduced.

Depending on the result of temperature comparison, the inlet air amount through the blower 8 is increased in a predetermined manner. For this, for example a ramp, which is selected depending on the result of the temperature comparison, can be used to increase the inlet air amount continuously or gradually.

During the whole controlling the inlet air density is readjusted depending on the detected air densities through repeated, especially continuous detecting of the room air density and the inlet air density. The inlet air density is adapted always to the room air density.

If the room temperature changes in the desired direction, the inlet air amount is reduced. The reducing depends on the remaining temperature difference and/or the speed of the temperature change in the room. The inlet air amount is reduced continuously in the course of temperature adaptation, until the minimum rotational speed of the inlet air blower 8 is achieved. The minimum rotational speed varies naturally for different inlet air blower types.

Preferably, only now an inlet air temperature change is carried out The inlet air temperature is adjusted from a high or low temperature, which is here still usually the maximum heating or cooling temperature, to a temperature which is closer to the desired room temperature. This occurs especially if a difference between the desired room temperature falls below a predetermined threshold value.

Through the long use of the very high or very low inlet air temperature the inlet air amount can be reduced clearly, which gives rise to the already described advantages.

The invention claimed is:

1. An apparatus for controlling a ventilating system, comprising:
    at least one temperature sensor, air humidity sensor, and air pressure sensor for detecting an air density in an inlet area;
    at least one temperature sensor, air humidity sensor, and air pressure sensor for detecting an air density in a room to be ventilated; and
    a controller, configured to determine an air density difference between the detected air density in the room to be ventilated and the detected air density in the inlet air area, and control the ventilation system such that the air density difference does not exceed a predetermined amount by executing a method comprising the following steps:
a) comparing a target room temperature with an actual room temperature,
b) if the temperature comparison results in a difference between the target room temperature and the actual room temperature that is greater than a predetermined threshold value, adjusting the inlet air temperature to an increased or decreased temperature, especially to a maximum heating or cooling temperature;
c) increasing an inlet air amount through an inlet air blower depending on the result of the temperature comparison;
d) repeatedly or continuously detecting the room air density and the inlet air density and readjusting the inlet air density depending on the detected air densities;
e) reducing the inlet air amount, as soon as the room temperature changes towards the target room temperature; and
f) changing the inlet air temperature from an increased or decreased temperature to a temperature closer to the target room air temperature if a difference between the target room temperature and the actual room temperature falls below a predetermined threshold value.

2. The apparatus according to claim 1, wherein the apparatus is adapted for addition to a conventional ventilating system as an additional module.

3. The apparatus according to claim 1, further comprising controllable flaps in communication with the controller and situated at an inlet of the inlet air area and/or at an outlet of the outlet air area.

4. The apparatus according to claim 3, further comprising a communication connection for transmitting operating data and/or for receiving instructions.

5. The apparatus according to claim 3, wherein the communication connection is a computer network connection.

6. A method for controlling a ventilating system, comprising:
detecting an air density in an inlet air area and an air density in a room to be ventilated;
determining an air density difference between the room to be ventilated and the inlet air area;
based on the air density difference, controlling the ventilation system so that the air density difference does not exceed a predetermined amount, wherein the method is executed in the following steps:
a) comparing a target room temperature with an actual room temperature,
b) if the temperature comparison results in a difference between the target room temperature and the actual room temperature that is greater than a predetermined threshold value, adjusting the inlet air temperature to an increased or decreased temperature, especially to a maximum heating or cooling temperature;
c) increasing an inlet air amount through an inlet air blower depending on the result of the temperature comparison;
d) repeatedly or continuously detecting the room air density and the inlet air density and readjusting the inlet air density depending on the detected air densities;
e) reducing the inlet air amount, as soon as the room temperature changes towards the target room temperature; and
f) changing the inlet air temperature from an increased or decreased temperature to a temperature closer to the target room air temperature if a difference between the target room temperature and the actual room temperature falls below a predetermined threshold value.

7. The method according to claim 6, wherein the air density is detected from measurements of air temperature, air humidity and air pressure.

8. The method according to claim 6, further comprising detecting an air density in an outside area.

9. The method according to claim 6, further comprising heating, cooling, humidifying, or dehumidifying the air in the inlet area.

10. The method according to claim 6, further comprising:
estimating an air quality in the room to be ventilated based on a measured air composition and controlling an outlet air amount based on the estimated air quality.

11. The method of claim 10, wherein the measured air composition is a carbon dioxide content.

12. The method of claim 10, wherein the measured air composition is determined with a mixed gas sensor.

13. The method according to claim 6, wherein the inlet air amount and/or the outlet air amount can be controlled variably.

14. The method according claim 6, further comprising introducing air into the room with a pressure which is higher than a pressure in the room.

15. The method according to claim 6, wherein the air density difference is minimized through the controlling.

16. The method according to claim 6, wherein the method is used for the ventilation of a swimming pool.

* * * * *